(12) United States Patent  (10) Patent No.: US 8,346,496 B1
Brecht et al.  (45) Date of Patent: Jan. 1, 2013

(54) APPARATUS AND METHOD FOR MULTI-CHANNEL MATERIALS ASSAYING

(75) Inventors: David Brecht, San Diego, CA (US); Patrick Bird, San Diego, CA (US)

(73) Assignee: Wildcat Disocovery Technologies, Inc, San Diego, CA (US)

( * ) Notice: Subject to any disclaimer, the term of this patent is extended or adjusted under 35 U.S.C. 154(b) by 255 days.

(21) Appl. No.: 12/853,634

(22) Filed: Aug. 10, 2010

Related U.S. Application Data

(60) Provisional application No. 61/237,469, filed on Aug. 27, 2009.

(51) Int. Cl.
- *G01R 19/00* (2006.01)
- *G01R 15/00* (2006.01)
- *G01R 29/00* (2006.01)
- *G01R 31/00* (2006.01)
- *G01R 31/01* (2006.01)
- *G01R 31/02* (2006.01)

(52) U.S. Cl. .............. 702/64; 702/57; 702/65; 324/415; 324/522; 324/537

(58) Field of Classification Search .................... 702/64, 702/57, 60, 65, 81, 116, 117, 182, 189, 190, 702/191; 324/415, 416, 512, 522, 523, 525, 324/527, 537, 750.01
See application file for complete search history.

(56) References Cited

U.S. PATENT DOCUMENTS

| | | | |
|---|---|---|---|
| 5,530,962 | A | 6/1996 | Ramey |
| 6,057,713 | A | 5/2000 | May et al. |
| 6,094,045 | A * | 7/2000 | Zoellick ........................ 324/115 |
| 6,193,873 | B1 | 2/2001 | Ohara et al. |
| 6,549,155 | B1 * | 4/2003 | Heminger et al. ............ 341/144 |
| 7,241,419 | B2 | 7/2007 | Ackley et al. |
| 2006/0180479 | A1 | 8/2006 | Sparkes et al. |
| 2008/0213875 | A1 | 9/2008 | Sharrock et al. |
| 2010/0169035 | A1 * | 7/2010 | Liang et al. ..................... 702/65 |

* cited by examiner

*Primary Examiner* — Cindy H Khuu
*Assistant Examiner* — Ricky Ngon
(74) *Attorney, Agent, or Firm* — Quinn Law Group, PLLC

(57) ABSTRACT

A system for assaying electronic or electrochemically active materials or devices made therefrom includes a microcontroller, a main digital-to-analog converter (DAC), current and voltage sensing modules, a reference voltage DAC, and a power switch. The reference voltage DAC applies a calibrated voltage across the materials/devices, and the switch disconnects the main DAC to generate an open-circuit voltage. The microcontroller assays the materials/devices using the measured voltage, measured current, reference voltage, and/or open-circuit voltage. The main DAC may include coarse and fine DACs. A method of assaying the materials/devices includes measuring an electrical current in and a voltage across the materials/devices using the respective current and voltage sensing modules, applying a reference voltage across the materials/devices using the reference voltage DAC, activating the switch to disconnect the DAC to generate the open-circuit voltage across the materials, and using the microcontroller to assay the materials/devices as noted above.

15 Claims, 2 Drawing Sheets

APPARATUS AND METHOD FOR MULTI-CHANNEL MATERIALS ASSAYING

CROSS-REFERENCE TO RELATED APPLICATIONS

This application claims priority to and the benefit of U.S. Provisional Patent Application No. 61/237,469, filed Aug. 27, 2009, which is hereby incorporated by reference in its entirety.

TECHNICAL FIELD

The invention relates to an apparatus and a method for multi-channel assaying of electrically and/or electrochemically active materials, including any devices or assemblies made from such materials.

BACKGROUND

The success of high-throughput synthesis of materials and subsequent assaying to identify properties of the materials is partially dependent on the reliability of the synthesis and assaying equipment, as well as on the efficiency of the assaying methods. Inherent equipment limitations can limit the ability of one using such equipment to explore a sufficiently wide variety of materials. Additionally, controlling the conditions applied to the materials and gathered measurements may create an additional spectrum of challenges. Conventional devices designed to overcome some of these challenges may not achieve the relatively high sample rates, accuracy, and precision required for certain material characterizations and/or synthesis processes.

SUMMARY

Accordingly, a method is set forth herein for controlling electrical current and voltage within electrically and/or electrochemically active materials. As used herein, the term "electrically and/or electrochemically active materials" refers to the materials themselves as well as to any devices or assemblies made from such materials. The method may be executed using a multi-channel, microcontroller-based assay circuit and an electrical current control loop. A host machine can monitor and facilitate assaying, e.g., by allowing a user to create a test structure with a step-by-step process of adding electrical current and voltage parameters at each step. Each channel of the microcontroller may be run independently and/or stopped and started as needed during assaying.

In particular, an assaying system as disclosed herein includes a microcontroller, a main digital-to-analog converter (DAC) controlled by the microcontroller, and different current and voltage sensing modules respectively operable for measuring an electrical current in and a voltage across a set of electrically and/or electrochemically active materials, and for transmitting the measured values to the microcontroller. The system also includes a reference voltage DAC which applies a calibrated reference voltage across the materials, and a power switch for electrically disconnecting the main DAC from the materials in order to generate an open-circuit voltage across the materials. The microcontroller assays the materials using at least one of the measured voltage, the measured electrical current, the reference voltage, and the open-circuit voltage.

A method of assaying electrically or electrochemically active materials includes measuring current and voltage values in the materials using respective current and voltage sensing modules, transmitting the measured values to a microcontroller, and applying a reference voltage across the materials using a reference voltage DAC. The method further includes activating a power switch to selectively disconnect a main DAC from the materials to thereby generate an open-circuit voltage across the materials, and assaying the materials via the microcontroller using at least one of the measured voltage, the measured electrical current, the reference voltage, and the open-circuit voltage.

The above features and advantages and other features and advantages of the present invention are readily apparent from the following detailed description of the best modes for carrying out the invention when taken in connection with the accompanying drawings.

DESCRIPTION

Figure 1:
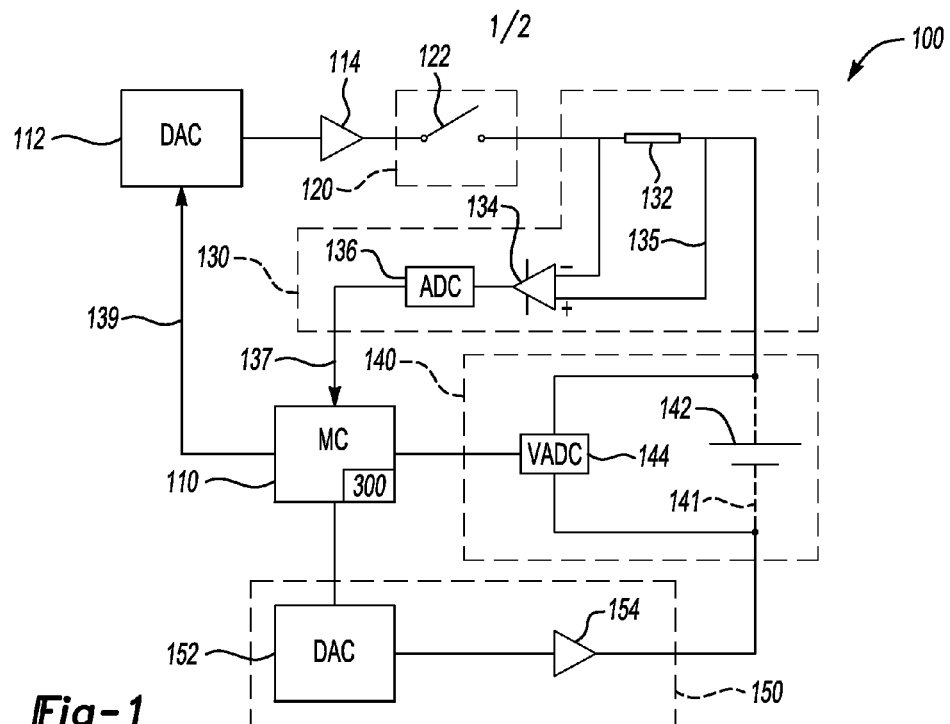
FIG. 1 is a schematic circuit diagram of an assay circuit in a first configuration.
Figure 2:
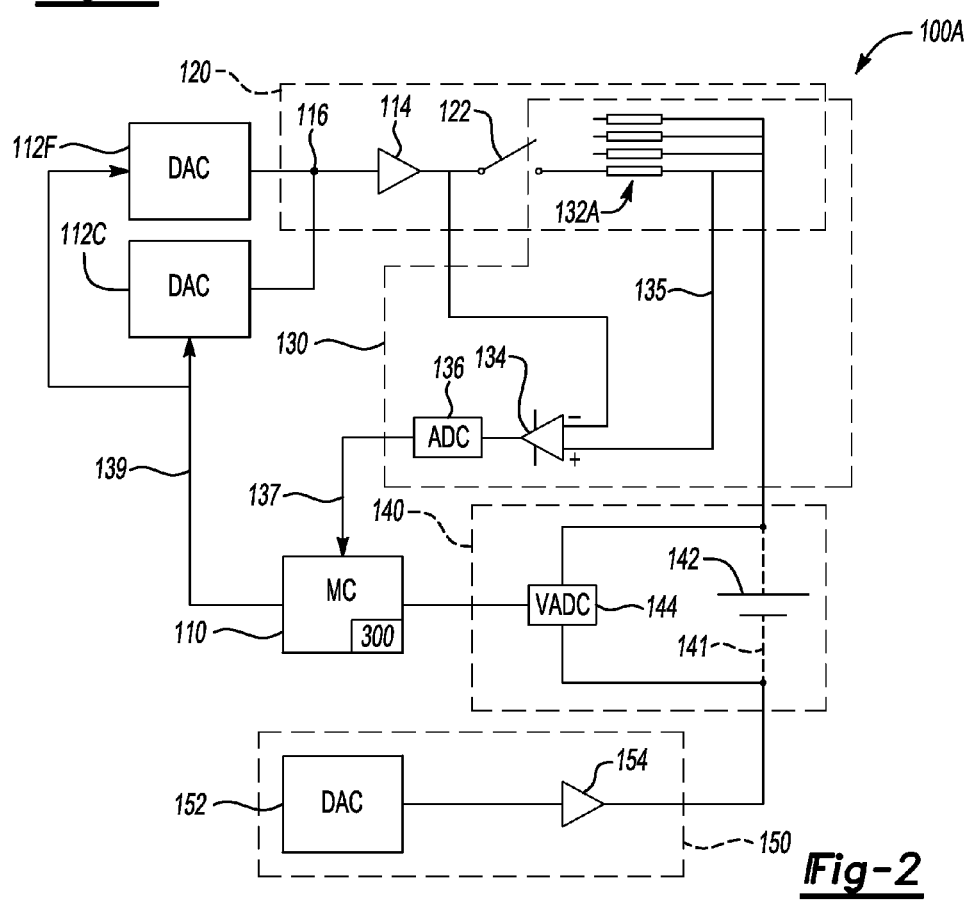
FIG. 2 is a schematic circuit diagram of the assay circuit of FIG. 1 in a second configuration.

Referring to the drawings, wherein like reference numbers correspond to like or similar components throughout the several figures, an assaying circuit 100 is shown which includes a microcontroller (MC) 110 as set forth below. As will be understood by those of ordinary skill in the art, and as used herein, the term "assay" refers to a data collection process performed by a measurement device on a set of materials, or a device made from such materials, which ultimately leads to a characterization of the various properties of that material. FIGS. 1 and 2 both show a possible embodiment for a set of assay materials 142. As used herein, the term "assay materials" refers to a set of electrically and/or electrochemically active materials, as well as to any device made from such materials. For example, test materials may include battery materials such as but not limited to active electrode materials, binders, additives, electrolytes, counter-electrodes, etc., although other materials or devices made from such materials such as capacitors, thermoelectrics, piezoelectrics, ferroelectrics, photovoltaics, electrocatalysts, or electrical sensors may also be assayed using the assaying circuit 100 disclosed herein.

Assaying circuits 100 and 100A of FIGS. 1 and 2, respectively, and an assaying system 200 (see FIG. 3) include components which collectively enable the precise assaying of various material properties when calibrated electrical voltages and currents are applied to the assay materials 142. An electrical current control algorithm 300 as discussed below with reference to FIG. 4 may reside within the microcontroller 110, or is otherwise readily accessible and executable by the microcontroller.

Microcontroller 110 sends electrical control signals 139 to a main digital-to-analog converter (DAC) 112, which has 16-bit precision in one embodiment. The output of the main DAC 112 passes to an operational amplifier or op-amp 114, i.e., a direct current (DC)-coupled high-gain electronic voltage amplifier. Op-amp 114 can function as a driver buffer. A multi-gain selection switch subsystem 120 is adapted to determine the gain to be applied within the assaying circuit 100 as explained below.

The assay materials 142 are positioned within a voltage sensing module 140. During assaying of the materials 142, an electrical current sensing module 130 senses or measures affected electrical currents as the electrical, chemical, and/or mechanical properties of materials 142 are manipulated. Likewise, voltage sensing module 140 senses or measures affected voltages across the materials 142 as the material properties are manipulated during assaying.

A reference voltage module 150 may be used to provide a baseline reference voltage and/or current, i.e., a voltage or current measured against as a calibrated baseline when the assay materials 142 undergo assay testing. Reference voltage module 150 may be electrically connected to and automatically controlled by the microcontroller 110. That is, the assaying circuit 100 is microcontroller-based, and is therefore capable of several different forms of battery cell control when used for assaying the materials 142 of a battery cell. In one embodiment, testing of a battery is conducted while maintaining constant electrical current and voltage values.

Still referring to FIG. 1, a multi-gain selection switch subsystem 120 can contain a power switch 122, e.g., a semiconductor switch or a solid-state device such as a relay or contactor. The on/off or open/closed status of the power switch 122 may be selectively controlled by the microcontroller 110 to enable generation and monitoring of an open circuit voltage across the materials 142, e.g., across a battery cell when the materials are used as part of a battery. Different control channels of microcontroller 110 may allow one or more power switches 122 to be controlled by a single microcontroller, with as many as eight or more switches controlled by a single microcontroller depending on the embodiment and intended use of the assaying circuit 100.

Electrical current sensing module 130 may contain at least one shunt resistor 132. A differential op-amp 134 can be used to connect both the positive and negative terminals of the shunt resistor 132. Differential op-amp 134 feeds an output signal 135 from the shunt resistor 132 to an analog-to-digital converter (ADC) 136 operable for measuring the electrical current passing through the ADC, doing so with 16-bit precision. Microcontroller 110 then measures an electrical current output 137 from the ADC 136, and uses this value in the various assaying calculations and/or threshold comparisons as set forth below.

Voltage sensing subsystem 140 contains both the assay materials 142 being tested and a voltage ADC (VADC) 144. Once the VADC 144 senses the voltage across materials 142, microcontroller 110 reads that voltage value and uses it in any required internal calculations. Microcontroller 110 may be configured to provide digital proportional and integral (PI) control functionality for optimized error compensation, with electrical signals 139 transmitted to the DAC 112.

Reference voltage module 150 includes a reference voltage DAC 152 which is also controlled by the microcontroller 110. Reference voltage DAC 152 drives a high-current op-amp 154 to apply a reference voltage 141 across the assay materials 142.

Assaying circuit 100 may be designed with a common reference voltage. Assaying circuit 100 allows for the reference voltage module 150 to provide both common negative electrode-based and common positive electrode-based measurements of the assay materials 142 without moving the materials to a different assay system, and without physically manipulating the orientation of the materials.

Reference voltage DAC 152 may be configured as a programmable DAC buffered by the high-current output op-amp 154 in order to allow common negative electrode assemblies or common positive electrode assemblies to be tested without additional circuitry, and without the need for electrical or mechanical switches and multiple reference voltages. To test assay materials 142 with a common negative electrode, reference voltage module 150 could be set to generate a calibrated voltage such that the individual positive electrodes operate at a higher voltage potential than the common negative electrode. Conversely, to test an assembly with a common positive electrode, module 150 may generate a voltage value such that the individual negative electrode operates at a lower voltage potential than the common positive electrode.

Referring to FIG. 2, in an alternative embodiment an assaying circuit 100A implements the shunt resistor 132 of FIG. 1 as an array of resistors 132A each having more than one resistance value, with the resistance value being selectable by the microcontroller 110, e.g., by choosing a given one of the resistors as needed. In this manner the microcontroller 110 can choose an appropriate gain value.

Use of Parallel Gain Stages at a System Level:

As noted above, main DAC 112 of FIG. 1 can have 16-bit precision in one embodiment. Resolutions higher than 16-bits can be used, although such resolutions may compromise the cost and sampling rate of the main DAC 112. While testing the assay materials 142, a voltage range of up to 10V may be used in one embodiment. When using a 16-bit main DAC, this results in a maximum precision of 0.15 mV per bit, i.e., 65,536 steps across the range of values that could be used during testing.

In order for microcontroller 110 to accurately control such a small current using a digital control loop, greater precision may be required depending on the measured response of the assay materials 142 to any step changes of approximately 0.15 mV. Some testing conditions may require greater levels of precision. Therefore, in the alternative embodiment of FIG. 2 the single main DAC 112 of FIG. 1 may be replaced by a separate coarse DAC 112C and fine DAC 112F. When applied and controlled together with the appropriate adjustable gains of the shunt resistor 132, the DAC 112C, 112F collectively provide an almost limitless combination of accuracy and precision ranges.

More particularly, the coarse DAC 112C and the fine DAC 112F can combine their outputs at a summing node 116, which may include a voltage divider and a balancing resistor in one embodiment. Coarse DAC 112C may be used to provide control over the entire working voltage range of assay materials 142. Fine DAC 112F may be used to increase the effective bits of the control loop output.

The output of fine DAC 112F may be attenuated by a fixed ratio using the voltage divider portion of the summing node. The voltage divider may consist of two high-precision resistors, or an integrated circuit having a fixed ratio. The balancing resistor of summing node 116 may be placed in series with the output of the coarse DAC 112C to match the reduced slew rate of the fine DAC 112F. The matched slew rate can help to ensure that the outputs of DAC 112C and 112F reach the summing node 116 at the same time. If they do not reach the summing node 116 at the same time, errors or glitches in the voltage output may appear, potentially causing perturbations in the current control.

Calibration Method of Parallel Gain Stages:

Many sources of nonlinearity exist in electronic circuits. The mV/bit output of the coarse DAC 112C and the fine DAC 112F must be precisely calibrated over the entire range for the control loop to work properly, particularly when the fine DAC 112F is reset while the control loop is active. DAC gain calibration can be performed in parallel with the current calibration routine. The coarse DAC 112C and the fine DAC 112F may be stepped across their respective voltage ranges and read back to the microcontroller 110 using VADC 144. The open-loop voltage response from each of DAC 112C and 112F can be analyzed thereafter for slope and nonlinear characteristics.

Control Algorithm of Parallel Gain Stages in a Current Control Loop:

Still referring to FIG. 2, when the control loop of the microcontroller 110 is activated, the fine DAC 112F is set to its idle position, i.e., its midpoint, and the coarse DAC 112C is used to bring the system to steady-state. When the system crosses over the zero error point using the coarse DAC 112C, the fine DAC 112F is enabled and the coarse DAC 112C is maintained at its last or previous value. The output of the fine DAC 112F will slowly rise as the assay materials 142 are charged. Because the fine DAC 112F has a limited range based on the voltage divider ratio, the coarse DAC 112C must be periodically increased during the charging process. The full-scale output range will have preset points where the fine DAC 112F is reset to its midpoint. When the output of summing node 116 reaches a calibrated reset point, the fine DAC 112F can be reset to near its midpoint, and the coarse DAC 112C can be adjusted in the opposite direction to negate the resultant output voltage change from changing the fine DAC 112F.

Figure 3:
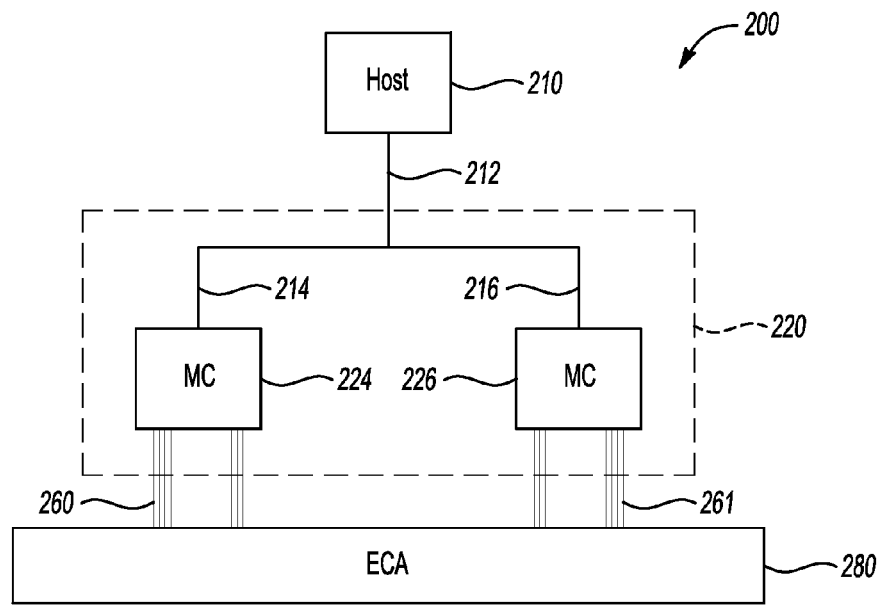
FIG. 3 is a block diagram of an assay system according to one possible embodiment.

Assay System:

Referring to FIG. 3, an assaying system 200 is presented in an embodiment which allows for measurements on 16 different channels of the microcontroller 110. Each channel could have one set of assay materials 142 undergoing assay testing, e.g., an electrochemical device such as a battery. The combination of the particular pieces or portions of materials 142 in an array forms an electrochemical assay matrix (ECA) 280. Testing of the ECA 280 may be coordinated using a host machine (HOST) 210 as described below, and the assaying of the ECA may be controlled and configured using the same device. Host machine 210 allows a user to create a test structure with a step-by-step process of adding electrical current and voltage parameters for each step of the process. Each channel of the microcontroller 110 can run independently, and can be stopped and started at any time.

Host machine 210 may include one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffer electronics. Individual control algorithms resident in the host machine 210 or readily accessible thereby may be stored in ROM or other suitable memory and automatically executed to provide the respective control functionality.

Host machine 210 may communicate with a microcontroller module subsystem (MMS) 220 over a communication link 212. The embodiment of FIG. 3 shows the MMS 220 with two microcontrollers (MC) 224 and 226, although any number of microcontrollers may be used in the MMS. Communication link 212 may be configured as a controller-area-network (CAN) bus according to one embodiment. If more than one microcontroller is used, each may include a respective individually-addressable segment 214 and 216 based on the CAN bus ID within the MMS 220.

Still referring to FIG. 3, MC 224 and the MC 226 communicate with the host machine 210 over the communication link 212, and send information including but not necessarily limited to data during the test. Such data may be sent to the host machine 210 at specified intervals for data logging. The information may be stored in nonvolatile memory, e.g., a nonvolatile memory module inserted into MC 224 and/or MC 226. Since the data may be stored in MC 224, MC226, and host machine 210, the risk of data loss is minimized when the host machine is forced to reboot, and/or upon failure of MC 224 or 226. MC 224, 226 may be fabricated with the assaying circuit 100 of FIG. 1 on a custom printed circuit board assembly with microcontroller 110 being configured as a floating-point 32-bit microcontroller 110 according to one possible embodiment. The firmware for both MC 224 and MC 226 may reside in onboard flash memory, and can be field-programmed via a built-in CAN bus data port if so configured.

Each MC 224, 226 on the CAN network 212 is given a specific identifier configurable with onboard dual in-line package (DIP) switches. This allows a seamless addition of additional ECA 280 or MC 224, 226 to the MMS 220 layer. Every channel will then be available from a single control program on the host machine 210. A user may not be able to perceive that there are multiple ECA 280 and multiple MC 224, 226 within the assaying system 200, with the user perceiving a single assay with multiple channels, up to the range of thousands of such channels.

Each MC 224, 226 is capable of controlling multiple electrochemical devices within the ECA 280. In FIG. 3, one channel for each MC 224, 226 is identified with reference number 260 and 261, respectively. The MC 224 and 226 may have mating headers so that they are interchangeable, and expandable to provide an increased number of channels of electrochemical control by connecting multiple MC.

In a particular embodiment, each MC 224, 226 may have a microcontroller 110 (see FIG. 1), eight SPI 16-bit DAC buffered with a high current op-amp buffer configured in unity gain mode. A high-side shunt resistor 132 may be used to measure the current being controlled through the electrochemical device. The resultant shunt voltage is amplified though a differential amplifier and read with a 16-bit ADC. A differential ADC configuration may be used to measure the voltage potential across the assay materials 142 of FIGS. 1 and 2.

Host machine 210 may be connected over the communication link 212 to the MMS 220. Within MMS 220, the communication link 212 can split into two individually-addressable segments 214 and 216. The segments 214 and 216 connect to respective MC 224 and 226. The MC 224 and 226 may connect directly to the ECA 280 via their respective channels, e.g., channels 260 and 261.

Figure 4:
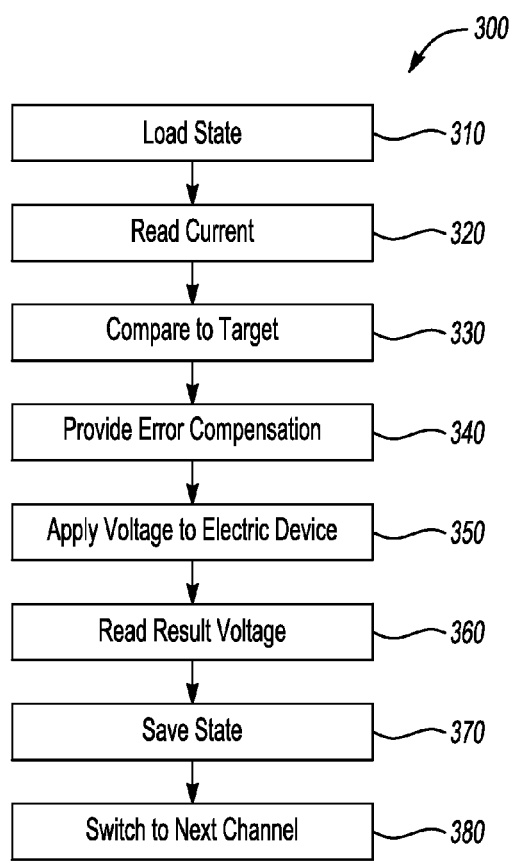
FIG. 4 is a flowchart describing a method for assaying a set of electrically and/or electrochemically active materials or devices using the assay circuits and assay system shown in FIGS. 1-3.

Control Method:

Referring to FIG. 4, the microcontroller 110 of FIGS. 1-3 processes a control loop to read from the multiple channels attached to, for example, MC 224 shown in FIG. 3. The microcontroller 110 can dynamically allocate channels for active use such that the microcontroller may increase the sampling rate for some channels, or may decrease the sampling rate in order to read more channels as the testing requires. The microcontroller 110 executes algorithm 300, the steps of which will now be described in turn.

At step 310, microcontroller 110 automatically loads from memory the state of the designated channel it is to sample. Once the state is loaded and internal components such as registers and stacks contain the stored values, the algorithm 300 proceeds to step 320.

At step 320, microcontroller 110 reads the current value from the electrical current ADC 136 and proceeds to step 330.

At step 330, the value read at step 320 is compared to a calibrated target value. The algorithm 300 then proceeds to step 340.

At step 340, microcontroller 110 calculates and provides error compensation by sending a corrective signal to the appropriate parts of the assaying circuit 100, including but not limited to particular adjustments to the DACs 112, 112C, and 112F using the process detailed above. See Control Algorithm of Parallel Gain Stages in a Current Control Loop. Algorithm 300 then proceeds to step 350.

At step 350, microcontroller 110 applies a voltage to the assay materials 142 being tested. The resulting voltage is read at step 360. Step 360 may include reading any electrical values such as current and/or voltage through the materials 142, open-circuit voltage across the materials, etc. The resulting voltage may be affected by the various electrical, chemical, and mechanical interactions that are being applied simultaneously to the materials 142.

At step 370, microcontroller 110 saves the current state of the various variables, registers, and stacks for the designated channel, and then proceeds to step 380.

At step 380, microcontroller 110 selects the next channel for sampling based on the desired sample rates assigned to the channels. Algorithm 300 then repeats steps 310-370 for the newly selected channel.

Referring again to FIG. 1, the algorithm 300 of FIG. 4 described above is examined with the affected component parts. All channels may be controlled sequentially in a high-speed firmware loop. The electrical current of the first channel is measured through high-side shunt resistor 132 with differential amplifier 134 connected to ADC 136 and then compared to the target current. A digital PI control loop may provide error compensation as detailed above with reference to FIG. 4.

The resultant output is then sent to the first channel's DAC 112, which can be buffered using op-amp 114. The voltage is applied to the assay materials 142 and read by VADC 144. The same is done for the next channel until all channels have completed, at which point the process starts over at channel one. Also, each channel can maintain a separate finite state machine or other suitable feature allowing the channels to run independently from each other.

While the best modes for carrying out the invention have been described in detail, those familiar with the art to which this invention relates will recognize various alternative designs and embodiments for practicing the invention within the scope of the appended claims.

The invention claimed is:

1. An assaying system for assaying a set of electrically or electrochemically active materials, the system comprising:
    a microcontroller;
    a main digital-to-analog converter (DAC) which is controlled via the microcontroller;
    an electrical current sensing module operable for measuring an electrical current in the materials, and for transmitting the measured electrical current to the microcontroller;
    a voltage sensing module operable for measuring a voltage across the materials, and for transmitting the measured voltage to the microcontroller;
    a reference voltage DAC which applies a calibrated reference voltage across the materials;
    a power switch controlled by the microcontroller, with the power switch being electrically connected to an output side of the main DAC and operable for electrically disconnecting the main DAC from the materials to produce an open-circuit voltage across the materials; and
    an array of shunt resistors;
    wherein the microcontroller assays the materials using at least one of the measured voltage, the measured electrical current, the reference voltage, and the open-circuit voltage, and is configured to select a shunt resistor in the array to thereby select a calibrated gain.

2. The system of claim 1, further comprising an operational amplifier electrically connected in series between the main DAC and the power switch, wherein the operational amplifier operates as a buffer.

3. The system of claim 1, further comprising: a host machine in communication with the microcontroller, wherein the host machine is operable for creating a test structure for the materials which permits adding of electrical current and voltage parameters by a user.

4. The system of claim 1, wherein the main DAC includes a fine DAC and a coarse DAC which combine their outputs at a summing node, the coarse DAC being adapted to provide control over the entire working voltage range of the electrochemical materials and the fine DAC adapted to increase the precision of the coarse DAC.

5. The system of claim 4, wherein the summing node attenuates the output of the coarse DAC by a fixed ratio.

6. The system of claim 1, wherein the materials include a positive electrode and a negative electrode, and wherein the reference voltage DAC enables a common negative electrode measurement and a common positive electrode measurement to be measured without changing orientation of the materials.

7. The system of claim 1, wherein the reference voltage DAC is programmable, and is buffered using a high-current operational amplifier.

8. The system of claim 1, wherein the microcontroller has at least 16 different and independently-controllable channels.

9. A method of assaying electrically or electrochemically active materials, the method comprising:
    generating a voltage input signal and a current input signal using a main digital-to-analog converter (DAC);
    measuring an electrical current in the materials and a voltage across the materials using an electrical current sensing module and voltage sensing module, respectively;
    transmitting the measured electrical current and voltage values to a microcontroller;
    applying a reference voltage across the materials using a reference voltage DAC;
    activating a power switch to selectively disconnect an output side of the main DAC from the materials to thereby generate an open-circuit voltage across the materials;
    feeding an electrical output of the main DAC through an array of shunt resistors providing a calibrated gain via a range of calibrated resistance values;
    automatically selecting a shunt resistor in the array using the microcontroller to thereby select the calibrated gain; and
    using the microcontroller to assay the materials using at least one of the measured voltage, the measured electrical current, the reference voltage, and the open-circuit voltage.

10. The method of claim 9, further comprising buffering an output of the main DAC using an operational amplifier which is electrically connected in series between the main DAC and the power switch.

11. The method of claim 9, further comprising:
    creating a test structure for the materials by adding electrical current and voltage parameters to a test sequence using a host machine.

12. The method of claim 9, wherein the main DAC includes a fine DAC and a coarse DAC which combine their outputs at a summing node, the method further comprising:
   using the coarse DAC to control the entire working voltage range of the materials; and
   using the fine DAC to increase a level of precision of the coarse DAC.

13. The method of claim 12, further comprising:
   attenuating the output of the coarse DAC by a fixed ratio using the summing node.

14. The method of claim 9, further comprising:
   buffering the output of the reference voltage DAC using a high-current operational amplifier.

15. An assaying system for assaying a set of electrically or electrochemically active materials, the system comprising:
   a microcontroller;
   a main digital-to-analog converter (DAC) which is controlled via the microcontroller;
   an electrical current sensing module operable for measuring an electrical current in the materials, and for transmitting the measured electrical current to the microcontroller;
   a voltage sensing module operable for measuring a voltage across the materials, and for transmitting the measured voltage to the microcontroller;
   a power switch controlled by the microcontroller, with the power switch being electrically connected to an output side of the main DAC and operable for electrically disconnecting the main DAC from the materials to produce an open-circuit voltage across the materials; and
   an array of shunt resistors;
   wherein the microcontroller assays the materials using at least one of the measured voltage, the measured electrical current, and the open-circuit voltage, and is configured to select a shunt resistor from the array to thereby select a calibrated gain.

\* \* \* \* \*